United States Patent [19]

Lessing

[11] Patent Number: 4,996,884

[45] Date of Patent: Mar. 5, 1991

[54] LIGHT WAVEGUIDE SENSOR FOR SMALL PULLING OR PRESSING FORCES

[75] Inventor: Rainer Lessing, Reichshof, Fed. Rep. of Germany

[73] Assignee: Felten & Guilleaume Energietechnik GmbH, Cologne, Fed. Rep. of Germany

[21] Appl. No.: 468,593

[22] Filed: Jan. 23, 1990

[30] Foreign Application Priority Data

Jan. 23, 1989 [DE] Fed. Rep. of Germany ....... 3901845

[51] Int. Cl.$^5$ .............................................. G01L 1/24
[52] U.S. Cl. ......................................... 73/800; 356/32
[58] Field of Search ............... 73/800, 862.62; 356/32; 350/96.30, 96.33

[56] References Cited

U.S. PATENT DOCUMENTS 4,634,217 1/1987 Levacher et al. ............. 350/96.3 X
4,737,012 4/1988 Murakami et al. ............ 350/96.3 X

FOREIGN PATENT DOCUMENTS 82820 6/1983 European Pat. Off. ............. 356/32

Primary Examiner—Jerry W. Myracle
Attorney, Agent, or Firm—Michael J. Striker

[57] ABSTRACT

A light waveguide sensor for small pulling or pressing forces comprises a primarily coated light waveguide, a coil wound on the light waveguide and composed of an element having a diameter which is smaller than a diameter of the primarily coated light waveguide, a casing surrounding the primarily coated light waveguide and the coil and composed of a fiber reinforced synthetic plastic material with longitudinally extending, pulling resistant fibers embedded in a synthetic plastic matrix, the coil being composed of a plurality of coils arranged in cross-lay relative to one another on the light waveguide and each having a pitch length greater than 2.2 times the diameter of the primarily coated light waveguide.

16 Claims, 1 Drawing Sheet

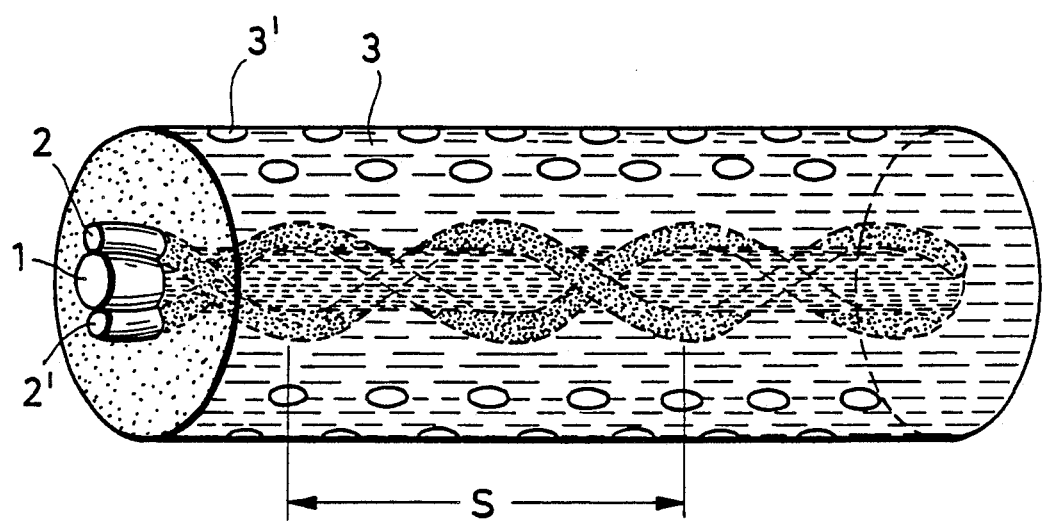

LIGHT WAVEGUIDE SENSOR FOR SMALL PULLING OR PRESSING FORCES

BACKGROUND OF THE INVENTION

The present invention relates to a light waveguide sensor for small pulling or pressing forces. More particularly, it relates to such a light waveguide sensor which has a primarily coated light waveguide, a coil wound on the light waveguide, and a casing surrounding the light waveguide and the coil.

Light waveguide sensor of the above mentioned general type are known in the art. One of such light waveguide sensors for pulling forces is disclosed for example in the German document DE-OS 3,526,966. In this reference, a coil wound on the light waveguide is composed of a metal wire, for example a steel wire with a thickness of 0.08 mm or a glass fiber, and then a pulling-resistant casing is applied around them. The casing is composed of a glass fiber reinforced thermoplastic material and is wire-shaped with an outer diameter of approximately 2 mm.

For forming the coils numerous approaches have been taken to the diameter and the pitch length and several coils can be wound around the primarily coated light waveguide in a parallel or cross-lay arrangement. Various materials have been proposed for the casing, for example fiber reinforced synthetic plastic resin (Duroplast), such as polyester resin with unidirectionally oriented glass fibers, and also thermoplasts.

This light waveguide sensor for pulling forces is more sensitive than the older sensor described in the German reference DE-OS 3,305,234 in which the coil of resin-impregnated glass fibers is wound on the light waveguide, or in homogenous synthetic plastic layer with addition of grainy glass or Corundum powder is applied. The utilization of such a sensor is described for monitoring concrete structural works such as a prestressed concrete bridge. The light waveguide sensor is located in a meander-like bedded prestressing wire of the bridge and the measuring ends of the light waveguide are connected with a light-passage testing device (damping measuring device) to allow a continuous mechanical monitoring of the bridge.

Such light waveguide sensors can be easily converted from pulling sensors to pressing sensors.

The German document DE-OS 3,628,083 described a ground plate from a beam with embedded light waveguide pressure sensors, in which the inhomogenous layer between the light waveguide and the casing is formed as a metal wire coil. This ground plate is embedded in buildings or environment for object protection in the ground.

The German Pat. Application P 3,809,957.8 discloses a light waveguide pressure sensor in which the inhomogenous layer between the light waveguide and the casing (protective casing) is formed as the above mentioned grainy synthetic plastic layer. The sensor acts as a signal generator or for release of protective devices at the forces of approximately 1 N. It is used predominantly as contact sensors in the safety technique for clamping, contacting or overriding protection.

In the light waveguide pulling sensor described in the German document DE-OS 3,526,966 only the embodiment with one coil is practically operative. For a sensor without casing (sensor core) composed of a primarily coated multimode lightwave guide with an outer diameter of approximately 175 um and gradiant fiver 50/125 and with a wound steel wire with a diameter of approximately 90 um the following is true:

By applying an axially acting force, this sensor is expanded and the steel wire is constricted into the light waveguide and therefore imparts light damping properties to the light waveguide due to the microbanding effect. The damping increase is linear with the expansion as long as the microbanding effect takes place. In all circumstances this is the case with a expansion of the sensor up to 0.3%. With greater expansions the sensor is rearranged so that finally the steel wire is directly clamped and now the light wave-guide is wound around it. Later on, in this expansion condition the damping of the sensor no longer changes.

A linearization of the damping is achieved by encasing of the sensor with fiber reinforced synthetic plastic material. With suitable selection of the parameters for light waveguide, wire and casing, an expansion sensor with linear damping-expansion ratio up to over 1.5% expansion is produced. Thereby values from 0.2 to 1.5 dB damping per one centimeter expansion are achieved.

The coordination of the parameters of the light waveguide-wire-casing is difficult and complicated to reproduce. This makes the manufacture of such an expansion sensor expensive, time consuming and complicated.

SUMMARY OF THE INVENTION

Accordingly, it is an object of the present invention to provide a light waveguide sensor of the above mentioned general type, which avoids the disadvantages of the prior art.

More particularly, it is an object of the present invention to provide such a light waveguide sensor which is simple to produce and also has an increased measuring sensitivity.

In keeping with these objects and with others which will become apparent hereinafter, one feature of the present invention resides, briefly stated, in a light waveguide sensor in which several, preferably two, coils are wound on a primarily coated light waveguide in cross-lay and the pitch length of each coil is greater than 2.2 times the diameter of the primarily coated light waveguide.

When the light waveguide sensor is designed in accordance with the present invention, it eliminates the disadvantages of the prior art and significantly increases the sensor sensitivity. The function of the sensor is performed solely by the sensor core including the light waveguide and two cross-laid coils, and the later encasing with fiber composite material no longer changes the optical properties of the sensor and serves exclusively for increasing the mechanical stability.

In accordance with another feature of the present invention, the primarily coated multimode light waveguide has an outer diameter between 0.1 and 0.3 mm preferably 0.15 mm, the two steel wires have a diameter between 0.6 and 0.12 mm preferably 0.09 mm, and the pitch length of the cross-lay is between 8 and 12 mm, preferably 10 mm.

Still a further feature of the present invention is that the coil pitch length corresponds to a pitch length of a gradient fiber, or in other words, the double lens focal length of the calimating lens sequence simulated by the gradient fiber, with ratio $n = 3, 4, 5 \ldots > 10$.

A further feature of the present invention is that the pitch lengths of the coils can be different from one another.

For utilization of the light waveguide sensor as expansion sensor in concrete construction works, its casing can be composed of a high-strength fiber composite material in which unidirectionally oriented glass fibers are bonded with polyester resin or it is composed of a thermoplast.

For utilization of the inventive sensor as contact sensor, its casing can be composed of a thermoplast in which a low number or no reinforcing fibers are embedded.

Finally, the outer surface of the casing can be provided with an implant structure for improved embedding into a structural element to be monitored.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a perspective view showing a light waveguide sensor in accordance with the present invention.

DESCRIPTION OF THE PREFERRED EMBODIMENT

A light waveguide sensor in accordance with the present invention is shown as an example in form of a light waveguide sensor provided with a casing of fiber composite material, on which two steel wire coils are wound in an insert cross-lay manner.

A light waveguide is identified with reference numeral 1. It can be formed as a 50/125 primarily coated light waveguide with an outer diameter for example 175 $\mu$m. One steel wire is identified with reference numeral 2 and can have a diameter of 90 $\mu$m. The other steel wire 2' is similar to the first steel wire and extends so as to intersect the latter. Reference numeral 3 identifies the casing of a glass fiber reinforced polyester resin. The casing is provided with a structured outer surface 3'. A pitch of the coils of the steel wires is identified as S.

The second wire 2' which is wound on the light waveguide 1 so as to intersect the first wire 2 prevents rearrangement of the light waveguide in the event of great expansion and fixes it in its original position along the longitudinal axis of the sensor in the event of great expansion.

Both wires can be stranded in one working step with cross-lay our counter-lay with identical parameters such as for example pitch lengths, pulling forces, etc., around the light waveguide rotating in the center. It is also possible however to arrange the second wire after arranging the first wire. The casing in accordance with a preferable embodiment is composed of a high strength fiber composite material in which unidirectionally oriented glass fibers are bonded with polyester resin.

In such sensor not only the damping-expansion diagram is linearized to greater expansion, but also the sensor's sensitivity is considerably increased. When the damping-expansion diagram is within the region of 1.5–2 dB damping per one centimeter expansion, the value up to 5 dB/cm is achieved without further mechanical amplifying mechanism. This pertains especially for the forces which act from the steel wire-intersection points onto the light waveguide.

If the periodicity of these intersection points is adjusted by respective selection of the coil pitch lengths to the so-called pitch length of the gradient fiber or in other words the double lens focal length of the collimating lens sequence simulated by the gradient fiber, the sensor sensitivity increases to the value over 10 dB/cm. In this case, however, the pulling force of the steel wires must be reduced so that no excessive base damping of the sensor is produced.

The high transverse pressure sensitivity of this expansion sensor can be used for utilizing the sensor as a sensitive contact sensor. When it is supplied in the regions where transverse pressures for example by the weight of a person occur, then it is easy to exceed an opto-electronically predetermined threshold. In this case the sensor produces an adjustable contact indicator which reacts in an exceptionally sensitive manner. Thresholds arranged in series can be provided for contact selection.

It will be understood that each of the elements described above, or two or more together, may also find a useful application in other types of constructions differing from the types described above.

While the invention has been illustrated and described as embodied in a light waveguide conductor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A light waveguide sensor for small pulling or pressing forces, comprising a primarily coated light waveguide; a coil wound on said light waveguide and composed of an element having a diameter which is smaller than a diameter of said primarily coated light waveguide; a casing surrounding said primarily coated light waveguide and said coil and composed of a fiber reinforced synthetic plastic material with longitudinally extending, pulling resistant fibers embedded in a synthetic plastic matrix, said coil being composed of a plurality of coils arranged in cross-lay relative to one another on said light waveguide and each having a pitch length greater than 2.2 times the diameter of said primarily coated light waveguide, said matrix being composed of a Duroplast.

2. A light waveguide sensor for small pulling or pressing forces, comprising a primarily coated light waveguide; a coil wound on said light waveguide and composed of an element having a diameter which is smaller than a diameter of said primarily coated light waveguide; a casing surrounding said primarily coated light waveguide and said coil and composed of a fiber reinforced synthetic plastic material with longitudinally extending, pulling resistant fibers embedded in s synthetic plastic matrix, said coil being composed of a plurality of coils arranged in cross-lay relative to one another on said light waveguide and each having a pitch length greater than 2.2 times the diameter of said primarily coated light waveguide, said matrix being composed of thermoplast.

3. A light waveguide sensor for small pulling or pressing forces, comprising a primarily coated light waveguide; a coil wound on said light waveguide and composed of an element having a diameter which is smaller than a diameter of said primarily coated light waveguide; a casing surrounding said primarily coated light waveguide and said coil and composed of a fiber reinforced synthetic plastic material with longitudinally extending, pulling resistant fibers embedded in a synthetic plastic matrix, said coil being composed of a plurality of coils arranged in cross-lay relative to one another on said light waveguide and each having a pitch length greater than 2.2 times the diameter of said primarily coated light wave-guide, said primarily coated light waveguide being formed as a multimode light waveguide with an outer diameter between 0.1 and 0.3 mm, said plurality of coils being formed by two steel wires with a diameter of between 0.06 and 0.12 mm, and the cross-lay being formed with a pitch length between 8 and 12 mm.

4. A light waveguide sensor as defined in claim 3, wherein the outer diameter of said primarily coated multimode light waveguide is 0.15 mm, the diameter of said steel wires being 0.09 mm, and the pitch length of the cross-lay being 10 mm.

5. A light waveguide sensor for small pulling or pressing forces, comprising a primarily coated light waveguide; a coil wound on said light waveguide and composed of an element having a diameter which is smaller than a diameter of said primarily coated light waveguide; a casing surrounding said primarily coated light waveguide and said coil and composed of a fiber reinforced synthetic plastic material with longitudinally extending, pulling resistant fibers embedded in a synthetic plastic matrix, said coil being composed of a plurality of coils arranged in cross-lay relative to one another on said light waveguide and each having a pitch length greater than 2.2 times the diameter of said primarily coated light waveguide, said coil having a coil pitch length corresponding to a pitch length of a gradient fiber with a double lens focal lengths of a collimating lens sequence simulated by the gradient fiber with ratio $n=1$ with $n=3, 4, 5 \ldots 10$.

6. A light waveguide sensor as defined in claim 5, wherein said element of said coil is composed of a metal wire.

7. A light waveguide sensor as defined in claim 5, wherein said element of said coil is composed of a glass fiber.

8. A light waveguide sensor as defined in claim 5, wherein said coil is composed of two such further coils.

9. A light waveguide sensor as defined in claim 5, wherein said further coils have pitch lengths which are different from one another.

10. A light waveguide sensor as defined in claim 5, wherein said casing is composed of a high strength fiber composite material with the fibers formed by unidirectionally oriented glass fibers in the matrix, so that the sensor can be used in concrete construction works.

11. A light waveguide sensor as defined in claim 10, wherein the glass fibers are bonded with the matrix composed of polyester resin.

12. A light waveguide sensor as defined in claim 10, wherein the glass fibers are embedded in the matrix composed of a thermoplastic.

13. A light waveguide sensor as defined in claim 5, wherein said casing has an outer surface provided with a structure for improving embedding in a structural element to be monitored.

14. A light waveguide sensor for small pulling or pressing forces, comprising a primarily coated light waveguide; a coil wound on said light waveguide and composed of an element having a diameter which is smaller than a diameter of said primarily coated light waveguide; a casing surrounding said primarily coated light waveguide and said coil and composed of a fiber reinforced synthetic plastic material with longitudinally extending, pulling resistant fibers embedded in a synthetic plastic matrix, said coil being composed of a plurality of coils arranged in cross-lay relative to one another on said light waveguide and each having a pitch length greater than 2.2 times the diameter of said primarily coated light waveguide, said casing being composed of a thermoplast, so that the sensor can be used as a contact sensor.

15. A light waveguide sensor as defined in claim 14, wherein a low number of reinforcing fibers are embedded in the thermoplast.

16. A light waveguide sensor as defined in claim 14, wherein the casing is composed of the thermoplast solely without fibers.

* * * * *